E. F. GRAEFE.
POULTRY AND ANIMAL FUMIGATING DEVICE.
APPLICATION FILED NOV. 24, 1909.
990,126.
Patented Apr. 18, 1911.
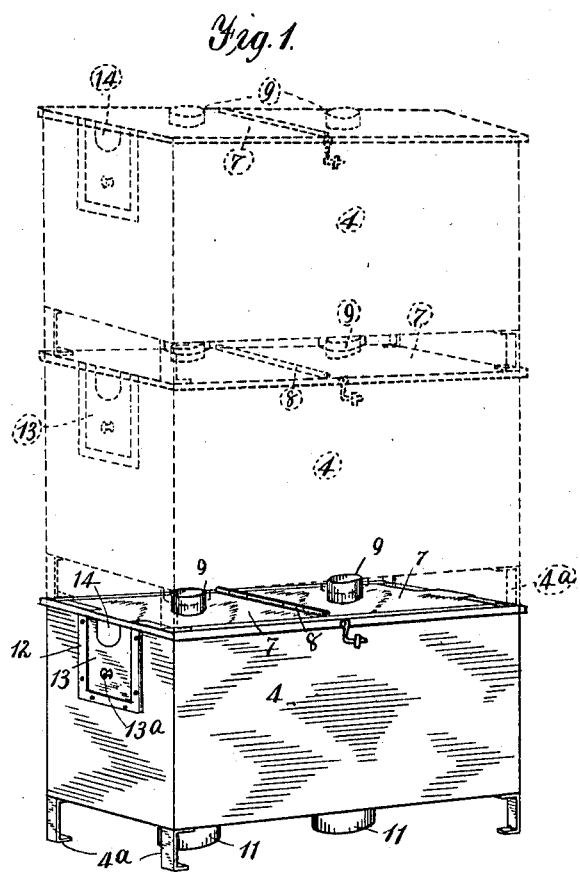
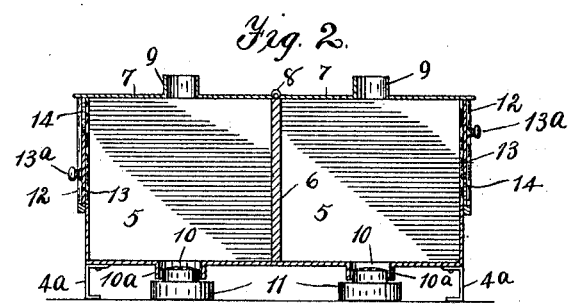
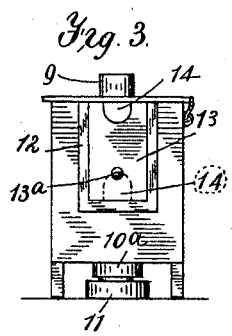
Witnesses
C. F. Bassett
M. A. Milord
Inventor
E. F. Graefe
By Frederick Benjamin
Attorney

UNITED STATES PATENT OFFICE.

ERNST FREDERICH GRAEFE, OF CISCO, TEXAS.

POULTRY AND ANIMAL FUMIGATING DEVICE.

990,126.  Specification of Letters Patent.  Patented Apr. 18, 1911.

Application filed November 24, 1909. Serial No. 529,706.

*To all whom it may concern:*

Be it known that I, ERNST F. GRAEFE, a citizen of the United States, residing at Cisco, in the county of Eastland and State of Texas, have invented certain new and useful Improvements in Poultry and Animal Fumigating Devices, of which the following is a specification.

This invention relates to improvements in apparatus for destroying vermin on poultry or other live stock and for fumigating fowls and animals.

One object of the improvements is to provide a fumigating appliance which can be readily used for large or small fowl or animals and in which a number of appliances can be assembled so that the fumes from one compartment will pass to the next compartment and thus economize in the use of fumigating materials.

A further object of my improvements is to produce a device of economical manufacture and one that is not liable to get out of order.

Having the aforegoing and other objects of general utility in view, I have produced the invention disclosed in the accompanying drawings in which:—

Figure 1 is a perspective view of an appliance embodying my invention with a series of similar appliances indicated by dotted lines in operative relation to the device shown in full lines; Fig. 2 is a cross section taken through my improved appliance, and Fig. 3 is an end view of same.

Referring to the details of the drawing, 4 represents a box made of suitable material and supported on legs 4ª secured at the corners thereof. This box as shown is provided with two compartments 5 which are separated by a vertical transverse partition 6. The box is closed at the top by lids 7 which are hingedly connected with each other at 8. These covers are provided with short centrally arranged chimneys 9. In the bottom of the box are openings 10 through which the fumes are admitted to the compartments 5 from a suitable fumigator supplying device 11. In the end walls of the box are openings surrounded by frames 12 which form a slideway for a vertical sliding door 13. This door is provided with a knob 13ª for convenient handling and is also provided in one of its edges with an opening 14.

In practice the door 13 will fit snugly in its bearings in the frame 12 so that considerable force will be needed to raise same thus providing against the possibility of the fowl or animal pushing same upwardly. The doors will be also held in place by the overhanging portion of the covers 7. Any suitable form of latching device may be used for locking the covers in position such means being shown as one of the well known forms of hooks or latches.

In the use of the appliance described it will be understood that the mouth of the box will be adapted for a matured fowl of average size which will be placed in the box with its head projecting through the opening 14 so that the fowl will not be smothered with the fumes from the fumigator. If the fowl is half-grown or a young chick the door 13 will be inverted so that the opening will come at the lower edge of the doorway as indicated by dotted lines in Fig. 3, thus permitting a smaller fowl to have its head extending from the box during the fumigating operations. By placing a plurality of these boxes one above the other as indicated in Fig. 1, the chimney 9 will be inserted in the collars 10ª of the flue opening 10 so that the fumes will pass upwardly through the various compartments until they escape at the top of the uppermost compartment or box. Sufficient of the fumes will escape around the neck of the fowl at the opening 14 to thoroughly fumigate the features of this portion of the fowl.

Having thus described my invention what I claim as new, is:—

An appliance for fumigating live stock, comprising a box having compartments adapted to receive the animals or birds to be treated, each of said compartments having a centrally arranged flanged inlet opening and outlet opening for the fumes, the outlet opening being of less diameter than the inlet opening whereby two or more of said appliances may be superimposed upon each other and have intercommunicating compartments, each of said compartments having an opening in one of its outside walls extending downwardly from the upper edge of said wall for a portion of the height of said wall, and a door slidably fitted in said opening, said door having an aperture in one edge and adapted to be inverted whereby said aperture will communicate with the lower part of said compartment, or the upper part, for the purpose set forth.

In testimony whereof I affix my signature in the presence of two witnesses.

ERNST FREDERICH GRAEFE.

Witnesses:
 AVNER MOYHEW,
 A. H. JOHNSON.

Copies of this patent may be obtained for five cents each, by addressing the "Commissioner of Patents, Washington, D. C."